United States Patent [19]

Crookshanks

[11] Patent Number: 4,739,186
[45] Date of Patent: Apr. 19, 1988

[54] FREQUENCY-SELECTABLE PULSED-SINUSOID GENERATION SYSTEM

[75] Inventor: Rex J. Crookshanks, Palos Verdes, Calif.

[73] Assignee: Hughes Aircraft Company, Los Angeles, Calif.

[21] Appl. No.: 897,558

[22] Filed: Aug. 18, 1986

[51] Int. Cl.⁴ .............................................. H04B 17/00
[52] U.S. Cl. ...................................... 307/106; 307/96; 342/201; 455/226; 364/724
[58] Field of Search ........................ 307/106, 132 R, 96, 307/260, 265, 261, 271; 455/213, 226, 207, 208, 234; 178/66.1; 328/13, 14, 15, 17, 27, 22; 370/45, 70, 71, 72, 73, 69.1; 364/724, 572, 574; 342/200, 201, 202, 131, 132, 133; 340/310 R, 310 A

[56] References Cited

U.S. PATENT DOCUMENTS

| | | | |
|---|---|---|---|
| 3,181,156 | 4/1965 | Ward | 342/132 X |
| 3,366,955 | 1/1968 | Mattern | 342/132 X |
| 3,701,154 | 10/1972 | McKinney | 342/132 X |
| 4,005,417 | 1/1977 | Collins | 342/132 X |
| 4,028,697 | 6/1977 | Albanese et al. | 364/574 X |
| 4,204,165 | 5/1980 | Ready | 455/226 |
| 4,245,352 | 1/1981 | Karpowycz et al. | 455/226 |
| 4,270,209 | 5/1981 | Albanese | 455/226 X |
| 4,283,767 | 8/1981 | Rountree | 364/574 |
| 4,302,844 | 11/1981 | Bruene | 340/310 A X |
| 4,422,175 | 12/1983 | Bingham et al. | 364/724 X |
| 4,524,362 | 6/1985 | Lewis | 342/201 |
| 4,524,363 | 6/1985 | Kretschmer | 342/201 |
| 4,560,961 | 12/1985 | Kestenbaum | 342/201 X |
| 4,566,010 | 1/1986 | Collins | 342/201 |
| 4,566,011 | 1/1986 | Lewis et al. | 342/201 |
| 4,661,819 | 4/1987 | Lewis | 342/201 |

Primary Examiner—William M. Shoop, Jr.
Assistant Examiner—Paul Ip
Attorney, Agent, or Firm—S. M. Mitchell; M. J. Meltzer; A. W. Karambelas

[57] ABSTRACT

A system for generating a sequence of pulses of carrier having individually selectable frequencies employs a pulsed oscillator for providing a single pulse of a carrier signal having a predetermined frequency. The single pulse is applied to a dispersive filter imparting a delay to signals dependent of their spectral content. The relatively broad spectrum of the single pulse is converted by the dispersive filter into a swept frequency pulse of much longer duration than the input pulse to the filter. The expanded signal is mixed with a set of mixing frequencies to provide a set of expanded signals, each of which is then gated to attain spectral portions having desired average values of frequency. The expanded signals are then summed together and applied to a compressive filter which operates in the mirror-image format to the dispersive filter. The compressive filter compresses each of the pulses of the expanded signals to a narrow pulse signal, the compressive filter outputting a succession of compressed pulses having carrier frequencies corresponding to those selected during the gating of the expanded signals.

25 Claims, 3 Drawing Sheets

FREQUENCY-SELECTABLE PULSED-SINUSOID GENERATION SYSTEM

BACKGROUND OF THE INVENTION

This invention relates to the generation of pulsed sinusoidal signals wherein the nominal frequency of each pulsed signal is preselectable and, more particularly, to the use of dispersive and compressive filters to provide a time-expanded version of each of a set of possible output signals. Frequency selection and signal conditioning is accomplished at a relatively slow rate upon the expanded version of the signal prior to compression of each of the set of signals to a desired set of rapidly occurring output pulses.

The transmission of pulsed sinusoidal signals of differing frequencies is employed in communications, as well as in radar and sonar. Various terms are used to describe such form of communication, including frequency diversity, frequency shift keying, and frequency hopping. Various forms of circuits have been provided to generate sequences of pulsed sinusoids at differing frequencies.

For example, in the case of a transmission employing only two frequencies, a switching circuit may be employed to select either one of two frequencies. For transmission with many different frequencies, a frequency synthesizer may be employed, such synthesizer including oscillators, multipliers, counters, gating circuits, and other such circuits, which, as is well known, are employed for the generation of specific frequencies selected by suitable control signals from a keyboard or from a modem. Also, a phase-locked loop may be employed in which case counters or other form of division circuitry are employed within the loop to produce various output frequencies.

A problem arises in that the repetition rate of the pulses is limited to the rate at which the frequency can be changed from pulse to pulse. Such limitations appear from ringing within a circuit as a pulse is turned on and turned off, as well as from transients associated with a lack of phase coherence from pulse to pulse. Accordingly, existing communication systems are limited in that their data transmission rates from that which should be theoretically possible to transmit, if circuitry were available for providing the pulses to a transmission channel.

SUMMARY OF THE INVENTION

The foregoing problem is overcome and other advantages are provided by a pulse frequency generation system having frequency dispersive filters characterized by time delays which are linearly proportional to frequency components of a signal propagating through the filters. The first filter operates as a dispersive filter, and receives an input sinusoidal signal pulse comprising approximately two cycles of a sinusoid. Such a signal has a broad spectrum resulting in the outputting by the filter of a set of spectral lines, individual ones of the spectral lines appearing sequentially in time due to the frequency-delay characteristic of the first filter. The output signal of the first filter has the form of a frequency chirp or sawtooth extending over a passband of significant frequencies of the original pulsed sinusoidal signal, and extending over a time duration much longer than the duration of the input pulsed sinusoidal signal.

The second of the two frequency-dispersive filters functions as a compression filter. An input signal to the second filter is composed of a pulsed, swept-frequency sinusoid. The second filter compresses its input signal to produce an output pulsed sinusoid which is substantially shorter in duration than the input signal and extends over an interval of approximately two cycles of a carrier having a nominal frequency equal to the midband frequency of the input swept sinusoid.

The effect of the two filters is to stretch out a short duration signal, and then to compress the signal back to a short duration signal. The expanded or long duration format of the signal provides adequate time for further manipulation of the signal, in accordance with a feature of the invention, so as to construct a sequence of rapidly occurring pulsed sinusoids having differing preselectable frequencies. Frequency shifting and selection is accomplished as follows.

A set of reference signals of differing frequencies is mixed with the expanded signal via a set of inphase and quadrature single-sideband mixers to provide a set of expanded versions of the signal, the expanded versions differing from each other with respect to their central frequencies while retaining the format of a swept frequency pulse of enlarged time duration. Each expanded signal is applied to a separate signal processor comprising inphase and quadrature multipliers which permit injection of an arbitrary phase angle, and adjustment of the signal amplitude through a complete range from zero through maximum amplitude. Each signal processor may be digitally controlled for selection of the section of each swept frequency sinusoid to be applied to the compression filter. The set of signal processors are operated simultaneously, and within a time frame which is substantially slower than the duration of an output compressed pulse. As a result, output compressed pulses of various frequencies can be selected in rapid occurrence by signal processors which are operated at much slower rates. Assuming that the signal processors are being operated at state-of-the-art rates, frequency selective pulsing (Frequency hopping) is available at a much higher rate than would be otherwise possible.

BRIEF DESCRIPTION OF THE DRAWING

The foregoing aspects and other features of the invention are explained in the following description, taken in connection with the accompanying drawing wherein.

DETAILED DESCRIPTION

Figure 1:
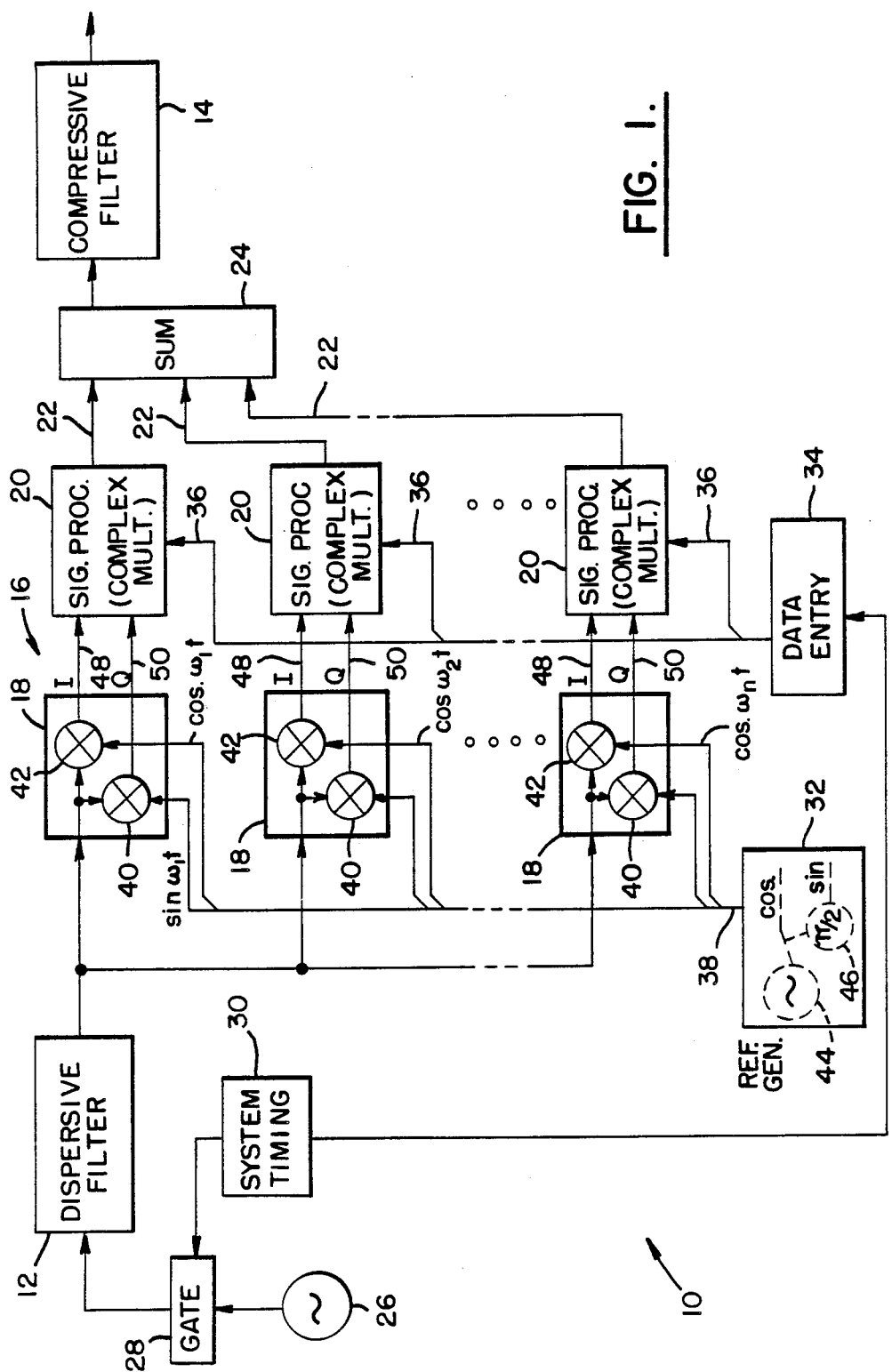
FIG. 1 is a block diagram of a pulsed sinusoid generation system with frequency selection in accordance with the invention.

FIG. 1 shows a system 10 which generates a succession of pulsed sinusoidal signals, wherein a carrier frequency of each of the signals can be selected so as to enable the transmission of data by a shifting of frequency from pulse to pulse in accordance with a predetermined code. In accordance with the invention, the system 10 operates by providing a set of signals which are expanded in time, the expanded signals being processed to provide for frequency selection and amplitude weighting at a relatively low rate of speed, after which the expanded signals are compressed into a sequence of compressed signals which occur at a relatively rapid rate and have a duration much shorter than the expanded signals.

Figure 2:
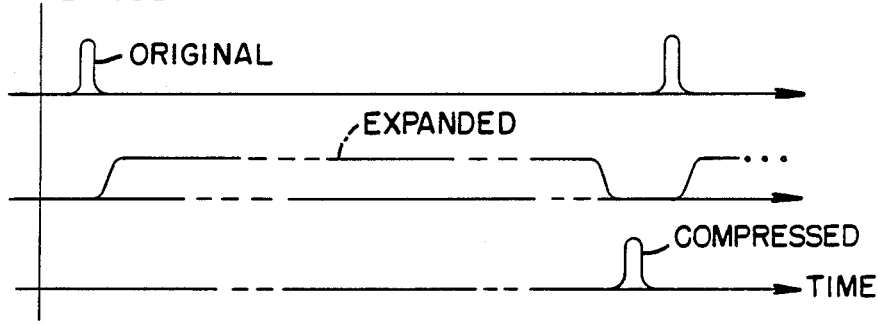
FIG. 2 is a timing diagram for the operation of the system of FIG. 1.

With reference also to FIG. 2, there is shown a set of three graphs in which the upper graph portrays a signal prior to expansion, the second graph shows an expanded version of the signal, and the third graph shows the signal compressed back to approximately its original duration. The portrayal of the operation of the invention in FIG. 2 is simplified by showing only one output pulse for one input pulse, it being understood that the system 10 includes circuitry as will be described subsequently for providing many output pulses for each input pulse. Also, the graphs of FIG. 2 show only the envelope of the signal, it being understood that each signal is a pulsed sinusoid. As will be explained hereinafter, the signal in its expanded form comprises a swept frequency sinusoid which may be many hundreds of cycles in duration while, in the cases of the original signal of the first graph and the compressed signal of the third graph, the pulse may comprise from one to five cycles, preferably two cycles, of carrier.

Figure 3:
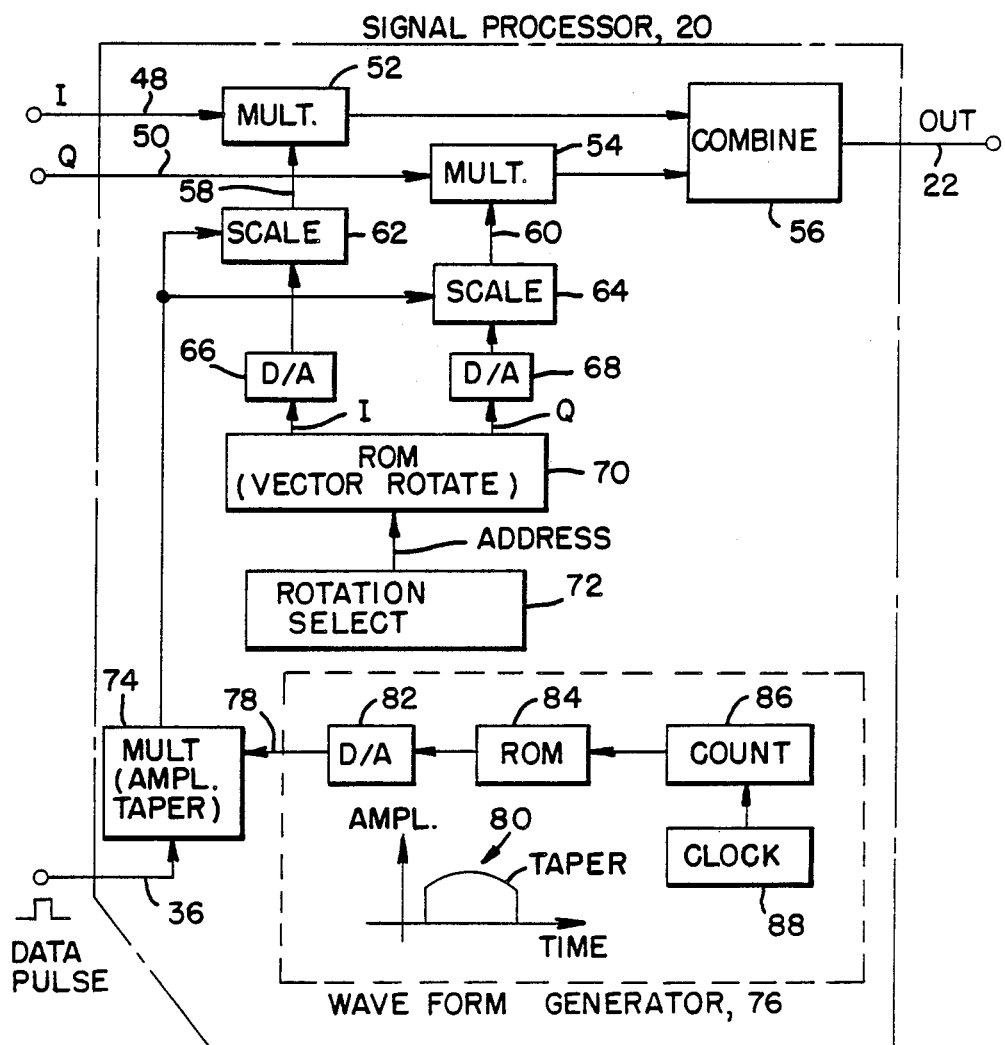
FIG. 3 is a block diagram of a signal processor of FIG. 1 providing complex multiplication.

The system 10 comprises a dispersive filter 12 and a compressive filter 14 between which are disposed a set of signal processing channels 16 each of which comprises a complex mixer 18 and a signal processor 20, the latter being described in further detail in FIG. 3. An output terminal of the dispersive filter 12 connects with an input terminal of the mixer 18 in each of the channels 16. Output terminals of respective ones of the processors 20 are coupled via lines 22 to a summer 24 which sums together the output signals of the respective processors 20 and applies the sum to an input terminal of the compressive filter 14.

The system 10 further comprises an oscillator 26, a gate 28, timing unit 30, a reference signal generator 32, and a data entry unit 34. The data entry unit 34 provides a sequence of output pulses in the format of digital words via lines 36 to each of the processors 20. The entry unit 34 comprises any one of well-known sources of data such as a keyboard, a modem, or memory (not shown) which is activated by timing signals of the unit 30 to drive the processors 20.

The oscillator 26 in combination with the gate 28 provides the input pulse signal, depicted in the first graph of FIG. 2, to the input terminal of the dispersive filter 12. The gate 28 is operated by the timing unit 30 to admit a relatively short burst of cycles of carrier frequency from the oscillator 26 to the filter 12, such short burst comprising from one to five cycles, perferably two cycles as was noted hereinabove in the description of the first graph of FIG. 2. The timing unit 30 may comprise a clock (not shown) and other well-known timing circuitry for producing any other timing signals which may be required for operation of the system 10, thereby to synchronize the operations of the respective components of the system 10.

The generator 32 provides inphase and quadrature reference signals via a set of output lines 38 to inphase multiplying elements 40 and quadrature multiplying elements 42 in respective ones of the mixers 18. By way of example in the construction of the generator 32, the generator 32 may comprise an oscillator 44 and a 90 degrees phase shifter 46 for each of the reference frequencies outputted via the line 38 or, alternatively, may incorporate a well-known frequency synthesizer (not shown) for generating the inphase and quadrature reference signals to be outputted via the lines 38. At each mixer 18 the two input reference signals have the same frequency, but differ in phase by 90 degrees. A different frequency is applied in the reference signals to each of the respective mixers 18 so as to provide a set of inphase (I) and quadrature (Q) signals on lines 48 and 50, respectively, from respective ones of the mixers 18.

The compressive filter 14 is constructed in the form of a pulse compression filter such as is employed in radar systems for the reception of radar signals. As is well known, such a filter receives a swept frequency sinusoid extending over a pulse of relatively long duration, and converts the pulse to one of relatively short duration which short duration pulse has a carrier frequency equal to the average of the swept frequency. Such filters fall within the class known as matched filters, wherein, as is well known, the impulse response of the filter has the same form, apart from a time reversal, as the envelope of the signal which is to be inputted to the filter. The output signal of the filter is given by the convolution integral of the filter impulse response and the signal envelope, the output signal being a narrow pulse when the signal envelope and the filter impulse response are properly matched. Such filters have been constructed of discrete circuit components such as inductors and capacitors, and more recently by surface acoustic wave (SAW) devices which, as is well known, are constructed of a crystalline material such as quartz and are provided with an electrode structure in which portions of the electrode structure are configured to resonate at specific frequency components of the input signal. The SAW devices which involve a conversion between an electric wave to a sonic wave can be operated as a much higher carrier frequencies than those filters constructed of discrete components. Most recently, magnetostrictive wave (MSW) devices have become available wherein the electric field associated with a voltage stress interacts with a crystalline material in accordance with a magnetostrictive effect to induce wave propagation between electrode structures at opposite ends of the crystal. The MSW devices can operate at still higher carrier frequencies, even into the gigahertz range.

The transit time through a SAW or MSW device for signal propagation is made frequency dependent by spacing electrodes tuned to one frequency with a spacing that is different for that of electrodes tuned to a second frequency. In addition, slots or other physical barriers may be introduced into the structure of the crystal to increase the propagation path link between electrode structures operating at specific frequencies or frequency bands of the transmission spectrum. In particular, it is noted that such spacing of electrode structures can be selected, as is well known, to provide a frequency dispersive characteristic wherein signals of increasing carrier frequency experience longer delays in propagating through the filter or, alternatively, the spacings can be selected to provide that signals with increasing frequency experience shorter delays in propagating through the filter. By matching the swept frequency characteristic of an input signal to the frequency-responsive delay of the filter, a relatively long-duration swept-frequency signal pulse can be converted by the filter to a much narrower pulse. This is the compression function and is provided by the compressive filter 14 for each of a set of swept-frequency signals outputted by the summer 24 to the filter 14.

The dispersive filter 12 is the same form of filter as is the compressive filter 14 and is constructed in the same fashion. However, the operation of the dispersive filter 12 is the opposite of that of the compressive filter 14. Instead of feeding in a swept-frequency pulsed sinusoid to provide a narrow output pulse, as is done with the compressive filter 14, a narrow pulse sinusoid is inputted to the dispersive filter 12 resulting in the production of a relatively long duration pulse of a swept-frequency sinusoid at the output terminal of the dispersive filter 12. A suitable narrow input pulse is the aforementioned pulsed sinusoid provided by the oscillator 26 in cooperation with the gate 28. The pulsing of the dispersive filter 12 may be regarded as inducing a ringing within the filter 12 with the result that each of the separately tuned portions of the electrode structure resonates at its own resonant frequency and that, furthermore, in view of the different propagation delays associated with each of the frequencies, the individual frequencies are outputted at a succession of different times resulting in the swept-frequency output signal. In particular, it is noted that the use of a common form of filter structure for both the dispersive filter 12 and the compressive filter 14 enables the characteristics of one filter to track the characteristics of the other filter, thereby to insure the production of a narrow pulse at the output of the compressive filter 14.

The plurality of channels 16 enables the system 20 to provide many output pulses from the compressive filter 14 for each single pulse inputted from the gate 28 to the dispersive filter 12. In each channel 16, the swept frequency signal of the dispersive filter 12 is applied to the inphase multiplying element 40 and the quadrature multiplying element 42 for multiplication by the corresponding reference signals of the generator 32. There results an inphase and quadrature output swept-frequency signal on the lines 48 and 50 of each of the mixers 18. The swept-frequency signals outputted by each of the mixers 18 have the same format, but differ with respect to their center frequency.

Referring momentarily to FIG. 3, it is noted that each signal processor 20 comprises a multiplier 52 and a multiplier 54 which are coupled, respectively, to lines 48 and 50 for receipt of the inphase and quadrature signals from the corresponding mixer 18. The output terminals of the multipliers 52 and 54 connect with a combiner 56 which vectorially combines, in a well-known fashion, the inphase and quadrature components to produce an output signal on line 22. The multipliers 52 and 54 receive multiplier signals on lines 58 and 60, respectively for amplitude weighting, for tapering the envelope, and for gating the inphase and quadrature signals as will be described subsequently. In addition, appropriate selection of the magnitudes of the signals on lines 58 and 60 can rotate the phase vector of the output signal of the combiner 56 on line 22. Thereby, each signal processor 20 can adjust the time of occurrence of an output signal of a channel 16, can adjust the duration of the output signal, the phase thereof, and provide any necessary amplitude taper. It is also noted that, in view of the swept frequency characteristic, any change in time of occurrence of the output signal of a processor 20 necessarily results in a shift of its frequency content.

Figure 4:
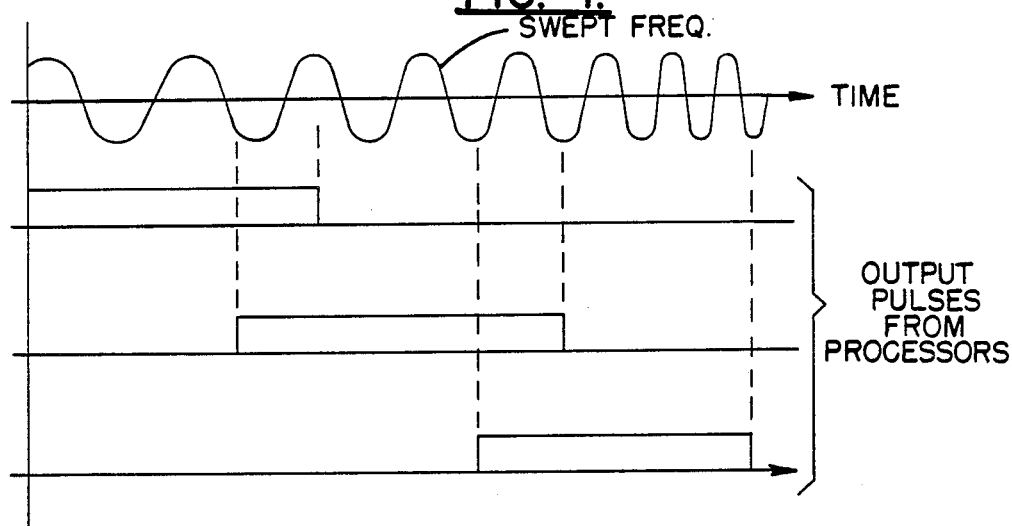
FIG. 4 shows a stylized view of a swept frequency sinusoid outputted by a dispersive filter of FIG. 1, and a set of signals outputted by a set of signal processing channels connected to the dispersive filter.

With reference also to FIG. 4, there is shown a stylized representation of the swept frequency sinusoidal pulse applied by the dispersive filter 12 to each of the mixers 18 in the respective channels 16. This is shown in the upper graph of the figure. In the lower three graphs of the figure, there are shown envelopes of three possible output signals of the processors 20. By way of example, one of the processor signals is shown from the low frequency portion of the swept frequency sinusoid, and the other two processor signals are shown, respectively, from the middle and upper frequency portions of the swept frequency sinusoid. It is noted that there is overlap in the times of occurrence of the output signals, and there is a corresponding overlap in the frequency content of the output signals of the processors 20. If desired, a processor 20 can be operated to provide two separate pulses within the duration of the input swept-frequency sinusoid. For each processor signal of FIG. 4, a corresponding compressed version is outputted by the compressive filter 14. A variation is the pulse width of the processor signals results in a corresponding variation in the energy content of the signal outputted by the compressive filter 14. While the signal envelopes shown in the second graph of FIG. 4 are of constant amplitude, it is to be understood that a time varying amplitude can be applied by each of the signal processors 20.

Figure 5:
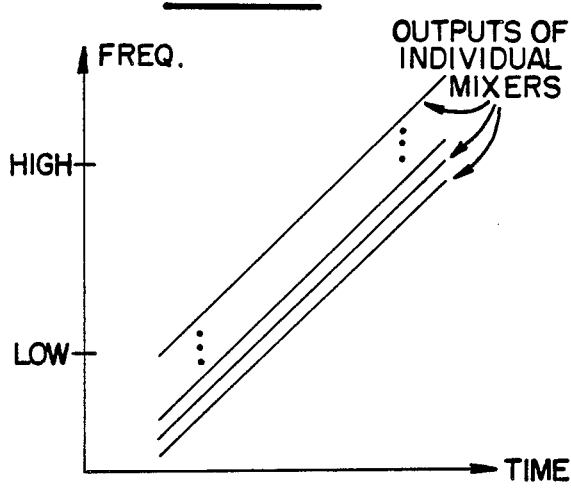
FIG. 5 is a graph of swept frequency outputs of single sideband mixers of FIG. 1.

A set of graphs which represent the swept-frequency signals outputted by respective ones of the mixers 18 is shown in FIG. 5. As has been noted above, each of these signals has the same form as the signal outputted by the dispersive filter 12, but differs with respect to the center frequency. Thus, the mixers 18 provide a set of swept frequency signals, each of which is offset from the other by the difference between frequencies of the reference signals provided by the generator 32. Accordingly, each of the graphs of FIG. 5 is a straight line, the various lines being uniformly displaced from each other in correspondence with a uniform spacing in frequency between the reference signals of the generator 32. The frequency shown in each graph represents the frequency of both the I and Q signal components on lines 48 and 50, since the two signals have the same frequency but differ only in phase angle.

Figure 6:
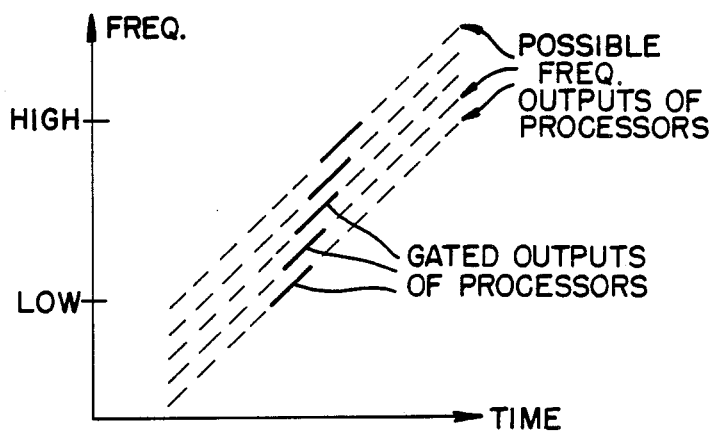
FIG. 6 is a graph showing swept frequency output signals of a set of signal processors of FIG. 1.

FIG. 6 shows a set of graphs similar to that of FIG. 5, the graphs of FIG. 6 representing the output signals of the signal processors 20. The graphs are portrayed by dashed lines and include a solid line portion. Each solid line portion represents the time of occurrence of an output signal, such as an output signal depicted in the second graph of FIG. 4, of one of the signal processors 20. FIG. 6 demonstrates how a later occurrence in the gating of an output signal of the signal processor 20 results in a higher frequency content to the spectrum of the signal. Similarly, an early occurrence of the output signal of the processor 20 results in a reduced value of frequency in the spectrum of the signal. In view of the frequency sweep, any offset in the time domain (the horizontal axis of FIG. 6) results in a corresponding shift in the frequency domain (vertical axis in FIG. 6). Thereby, a specific frequency in the output signal of a processor 20 can be selected by advancement or retardation in the time of occurrence of the output signal of the processor 20. As noted hereinabove, all of the output signals of the signal processors 20 are couples via the summer 24 to the compressive filter 14. In the operation of the compressive filter 14, the principle of superposition applies so that each signal of each individual processor 20 is separately compressed by the filter 14 irrespectively of the presence or absence of an output signal from another of the processors 20.

Figure 7:
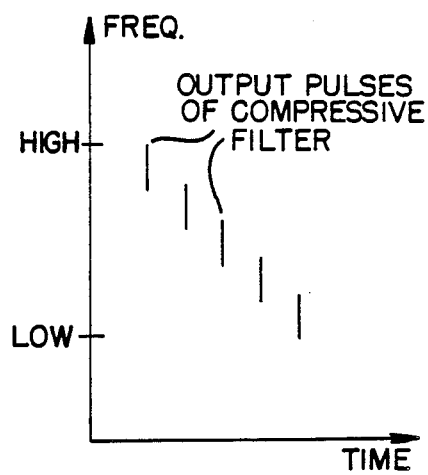
FIG. 7 is a sequence of output pulsed sinusoids of differing frequencies presented by an output compression filter of FIG. 1.

FIG. 7 shows a succession of output pulse signals reduced by the compressive filter 14 in response to a set of input signals applied by the processors 20. It is noted that the time of occurrence of an output signal is dependent of the frequency content of that signal. If the full passband of the swept frequency signal outputted by the dispersive filter 12 is utilized, this corresponding to the situation depicted in FIG. 2, then the output signal appears when all of the frequency components have undergone their respective propagation delays in the filter 14. However, in the case portrayed in FIG. 6, wherein each of the processors 20 selects only a portion of the swept frequency signal outputted by the dispersive filter 12, the respective spectral regions of the processor pulses undergo separate amounts of delay and, accordingly, appear at different instances of time. The vertical lines in FIG. 7 are drawn with a relatively narrow width, this to indicate the relatively short duration of each output pulse from the filter 14. The vertical length of each line represents the portion of the swept-frequency spectrum utilized by the processor 20 in forming each output signal.

It is noted that the output signals can be spaced with different spacings along the time axis, the most dense spacing occurring when the leading and trailing edges of successive output pulses begin to contact each other. The dense spacing corresponds to a high output data transmission rate, and can best be obtained by minimizing any transients associated with any differences in phase angle between successive ones of the output pulses. This is accomplished by adjusting the amount of phase vector rotation to each signal processed by a signal processor 20. The vector rotation will be described subsequently. Thereby, and with reference to FIG. 1, the single output pulse of the dispersive filter 12 has been converted into a succession of many output pulse signals of the compressive filter 14. While the output signals of the compressive filter 14 occur at a high data rate, the control and formation of these signals is accomplished in each of the channels 16 at a relatively slow data rate. In particular, it is noted that the formation of a plurality of output signals can be accomplished simultaneously by the plurality of signal processing channels 16.

With reference again to FIG. 3, the signal processor 20 further comprises scalers 62 and 64, digital-to-analog converters 66 and 68, a read-only memory 70 addressed by a rotation selector 72, a multiplier 74 and a waveform generator 76. The memory 70 is employed to rotate the vectorial sum of the inphase and quadrature components of the signal on lines 48 and 50 to provide a desired resultant phase angle to the combined signal on line 22. The combination of inphase and quadrature components, as is accomplished by the combiner 56, is well known and, similarly, the rotation of a resultant vector by operation of its components is well known. Accordingly, each of the multipliers 52 and 54 is understood to be a complex multiplier and includes circuitry for inserting a phase shift as well as an amplitude scale factor to the I and Q signals on lines 48 and 50.

In the operation of the signal processor 20, the selector 72 addresses the memory 70 to provide I and Q command signals for operation of the phase shift portions of the multipliers 52 and 54. The selector 72 may be a manually operated digital switch or keyboard which generates an address for the memory 70, the address selecting the I and Q command signals in accordance with the desired amount of rotation inputted by the selector 72. Output digital signals of the memory 70 are converted by the converter 66 and 68 to analog signals which are applied via the scalers 62 and 64 to operate the phase shift portions of the multipliers 52 and 54. This results in a rotation of the output vector by a desired increment in phase. An input data pulse, on line 36, is applied by the entry unit 34 and via the multiplier 74 to the scalers 62 and 64. The scalers 62 and 64 adjust the gains of the multipliers 52 and 54 so as to alter the magnitude of a signal component on line 48 or 50, or to gate the signal components on or off as is required to establish a pulse such as that shown in the bottom three graphs of FIG. 4.

The waveform generator 76 produces an output signal of varying amplitude on line 78 for use in gating the amplitude of an output signal of the processor 20 on line 22, or for introducing a taper to such signal. An example of such taper is shown in a graph 80 located within the block of the generator 76. The amplitude control signal on line 78 is applied via the multiplier 74 to the scalers 62 and 64. Thus, the output signal of the multiplier 74 is the product of the signals appearing on lines 36 and 78, this product containing information both as to amplitude shaping as well as to signal gating. The output signal of the multiplier 74 is applied via the scalers 62 and 64 to control the gain portion of the complex multipliers 52 and 54 while the signals from the memory 70 are employed for adjustment of the phase angles in each of the complex multipliers 52 and 54. Thereby, the signal processor 20 is capable of adjusting both the amplitude and phase of the output signal in line 22.

The waveform generator 76 comprises a digital-to-analog converter 82, a read-only memory 84, a counter 86, and a clock 88. In the operation of the generator 76, the memory 84 stores a set of amplitude scaling factors which are addressed by a count of the counter 86. The counter is driven by clock pulses of the clock 88 or, alternatively, if desired, by clock pulses supplied by the timing unit 30 of FIG. 1. The counter 86 provides many counts during each signal pulse so as to generate a suitable amplitude taper or weighting function. The digital output of the memory 84 is converted by the converter 82 to an analog signal, this being the signal on line 78 for control of the weighting and taper.

By way of example in the production of the output signals of the dispersive filters 12 and 14, it is noted that such signal may have a pulse duration of approximately one-tenth nanosecond. Since this duration accommodates approximately two seconds of carrier within the pulse, there is a broad frequency spectrum having significant lines over a spectrum centered at the carrier frequency and having a bandwidth equal to approximately two-thirds the carrier frequency. The filters 12 and 14 are fabricated, preferably, with a bandpass characteristic which is sufficient to take advantage of the foregoing signal bandwidth.

With respect to the mixing frequencies of the reference signals on line 38, (FIG. 1) assuming a carrier frequency of 10 GHz (gigahertz) outputted by the dispersive filter 12, a set of reference signals spaced apart by 0.1 GHz would be employed. Thirty such reference signals would be employed to accommodate an input signal band of 8.5-11.5 GHz. By use of mixing frequencies in the range of 5-8 GHz, either the lower or the upper sideband of the mixing operation can be employed for producing an output signal of the compression filter 14 which has a nominal carrier frequency which is less than or greater than the output frequency of the filter 12, depending on the choice of sideband.

In the event that it is desired to have the same output frequency from the compressive filter 14 as is present in the dispersive filter 12, than an additional set of mixers (not shown) would be inserted within the summer 24 at each of the lines 22 for mixing the output signals of the processors 20 back up to, or down to, the value of the nominal frequency of the dispersive filter 12. In case the additional set of mixers is employed, then the intermediate frequencies of the channels 16 may be lowered towards baseband by a suitable choice of reference signals of the generator 32, thereby to facilitate operation of the mixer 18 and the processor 20 in each of the channels 16. The choice of the spacing between successive ones of the mixing frequencies depends on the reciprocal of the pulse width of pulses produced by the compressive filter 14, this to allow for a maximum repetition frequency of such pulses.

In the operation of the system 10, the timing unit 30 strobes the gate 28 repetitively to provide a succession of pulses to the dispersive filter 12, two such pulses being shown in the first graph of FIG. 2. The spacing between the pulses is sufficiently long to accommodate the succession of pulses portrayed in FIG. 7, which succession results from each of the pulses appearing in the first graph of FIG. 2. Pulsecompression ratios, or aspect ratios, which can be obtained with modern pulse compression filters can be as high as 5,000:1, or even 10,000:1. By use of a filter construction for the filters 12 and 14 providing such high aspect ratios, very narrow pulses at a very high repetition frequency can be outputted by the filter 14 while still providing ample time in the expanded signals of the channels 16 to accomodate any form of modulation such as the aforementioned gating, amplitude taper, and phase correction so as to enable a smooth transition between successive pulses outputted in the pulse train from the compressive filter 14.

In view of the foregoing description, it is appreciated that the a system 10 introduces a frequency hopping capacity to a communication system having a relatively high pulse repetition frequency while the actual control of the individual ones of the pulses is attained at a much slower rate. An additional feature of the invention is the employment of the amplitude and phase adjustment capability of each of the processors 20 to compensate for any phase and amplitude irregularity which may be found in either of the filters 12 and 14 resulting from the process of manufacture of the filters.

It is to be understood that the above described embodiment of the invention is illustrative only, and that modification thereof may occur to those skilled in the art. Accordingly, this invention is not to be regarded as limited to the embodiment disclosed herein, but is to be limited only as defined by the appended claims.

I claim:

1. A frequency-selectable pulse generation system comprising:

means for simultaneously generating from a single input pulse a set of simultaneous swept-frequency signals offset in frequency from each other;

means for selecting a portion of each of said swept-frequency signals in response to control signals from a control signal source; and means coupled to said selecting means for compressing the selected portion of each of said signals to provide a succession of output pulses, said compressing means delaying each of said output pulses in accordance with a frequency content of the corresponding selected portion.

2. A system according to claim 1 wherein said selecting means selects each of said portions in accordance with a desired range of frequency sweep.

3. A system according to claim 1 wherein said selecting means selects each of said portions in accordance with a time of occurrence of said portion.

4. A system according to claim 1 wherein said selecting means includes means for shaping an envelope of each of said selected portions.

5. A system according to claim 4 wherein each of said swept-frequency signals has a carrier, and said selecting means includes means for adjusting the phase of the carrier in the selected portion of each of said signals.

6. A system according to claim 5 wherein a frequency of said carrier varies with time, and the selected portion of each of said signals occurs in a selected interval of time corresponding to a selected range of frequencies.

7. A system according to claim 6 wherein said carrier frequency varies linearly with time.

8. A system according to claim 1 wherein said generating means comprises:

pulsed-oscillator means for providing as the single input pulse a portion of a carrier signal from a carrier signal source; and a dispersive filter having a time delay versus frequency characteristic extending over a spectral region of said pulse of carrier signal, said dispersive filter converting said pulse of carrier signal into an expanded swept-frequency signal used in the generation of the set of simultaneous swept-frequency signals.

9. A system according to claim 8 wherein said generating means further comprises mixing means coupled to said dispersive filter for mixing said expanded swept-frequency signal with a set of reference signals to produce said set of swept-frequency signals.

10. A system according to claim 9 wherein said selecting means selects each of said portions in accordance with a desired range of frequency sweep.

11. A system according to claim 9 wherein said selecting means selects each of said portions in accordance with a time of occurrence of said portion.

12. A system according to claim 9 wherein said selecting means includes means for shaping an envelope of each of said selected portions.

13. A system according to claim 12 wherein each of said swept-frequency signals has a carrier, and said selecting means includes means for adjusting the phase of the carrier in the selected portion of each of said signals.

14. A system according to claim 13 wherein a frequency of said carrier varies with time, and the selected portion of each of said signals occurs in a selected interval of time corresponding to a selected range of frequencies.

15. A system according to claim 14 wherein said carrier frequency varies linearly with time.

16. A pulse frequency generation system comprising:
   means for generating a pulse of carrier signal having a predetermined duration;
   means for expanding said signal to be a first expanded signal extending over an interval of time longer than the duration of said pulse;
   means for duplicating the format of said first expanded signal to provide simultaneously a set of second expanded signals having the same format but being offset from each other in frequency;
   means coupled to said duplicating means for modulating each of said second expanded signals to have selected amplitude and frequency characteristics in response to control signals from a control signal source; and
   means coupled to said modulating means for compressing each of said second expanded signals to provide a sequence of compressed signals which correspond to respective ones of said expanded signals.

17. A system according to claim 16 wherein said expanding means comprises a dispersive filter having a time delay versus frequency characteristic extending over a spectral region of said pulse of carrier signal, said dispersive filter converting said pulse of carrier signal into a swept-frequency signal which constitutes said first expanded signal.

18. A system according to claim 17 wherein said duplicating means comprises mixing means coupled to said dispersive filter for mixing said swept-frequency signal with a set of reference signals to produce said set of second expanded signals.

19. A system according to claim 18 wherein each of said second expanded signals is a swept-frequency signal.

20. A system according to claim 19 wherein said modulating means includes means for gating a portion of each of said second expanded signals.

21. A system according to claim 20 wherein said compressing means includes means coupled to said modulating means for summing together each of said second expanded signals prior to a compression of said second expanded signals.

22. A system according to claim 21 wherein said compressing means further comprises a filter having a delay dependent on the instantaneous frequency of each of said second expanded signals.

23. A system according to claim 16 wherein said modulating means includes means for gating a portion of each of said second expanded signals.

24. A system according to claim 23 wherein said compressing means includes means coupled to said modulating means for summing together each of said second expanded signals prior to a compression of said second expanded signals.

25. A system according to claim 24 wherein said compressing means further comprises a filter having a delay dependent on the instantaneous frequency of each of said second expanded signals.

* * * * *